United States Patent [19]

Lee

[11] 4,307,414
[45] Dec. 22, 1981

[54] CCD COMB FILTER AND DEMODULATION SYSTEM

[75] Inventor: Ronald B. Lee, Skokie, Ill.

[73] Assignee: Zenith Radio Corporation, Glenview, Ill.

[21] Appl. No.: 187,927

[22] Filed: Sep. 17, 1980

[51] Int. Cl.³ ............................................ H04N 9/535
[52] U.S. Cl. ......................................... 358/31; 358/23
[58] Field of Search ............................... 358/31, 40, 23

[56] References Cited

U.S. PATENT DOCUMENTS 3,996,610  12/1976  Kawamoto ............................ 358/31

*Primary Examiner*—Richard Murray
*Attorney, Agent, or Firm*—Jack Kail; John H. Moore

[57] ABSTRACT

A CCD comb filter and color demodulation system is described for use in a color television receiver. The system includes a CCD comb filter receiving a video signal having interleaved luminance and color components, the latter components including a color subcarrier at a nominal frequency. Preferably, the comb filter includes but two CCD devices which receive the input video signal and apply their sampled outputs to a summer to develop combed luminance components and combed color components which occupy different frequency bands. The combed color components include a color subcarrier and sidebands which are translated upward in frequency by a given multiple of the nominal subcarrier frequency. The latter components are applied to a pair of CCD output filters which are clocked to sample the color components at the given multiple of the nominal subcarrier frequency for developing baseband demodulated color signals. The preferred embodiment also provides on-chip vertical peaking of the combed luminance components.

13 Claims, 8 Drawing Figures

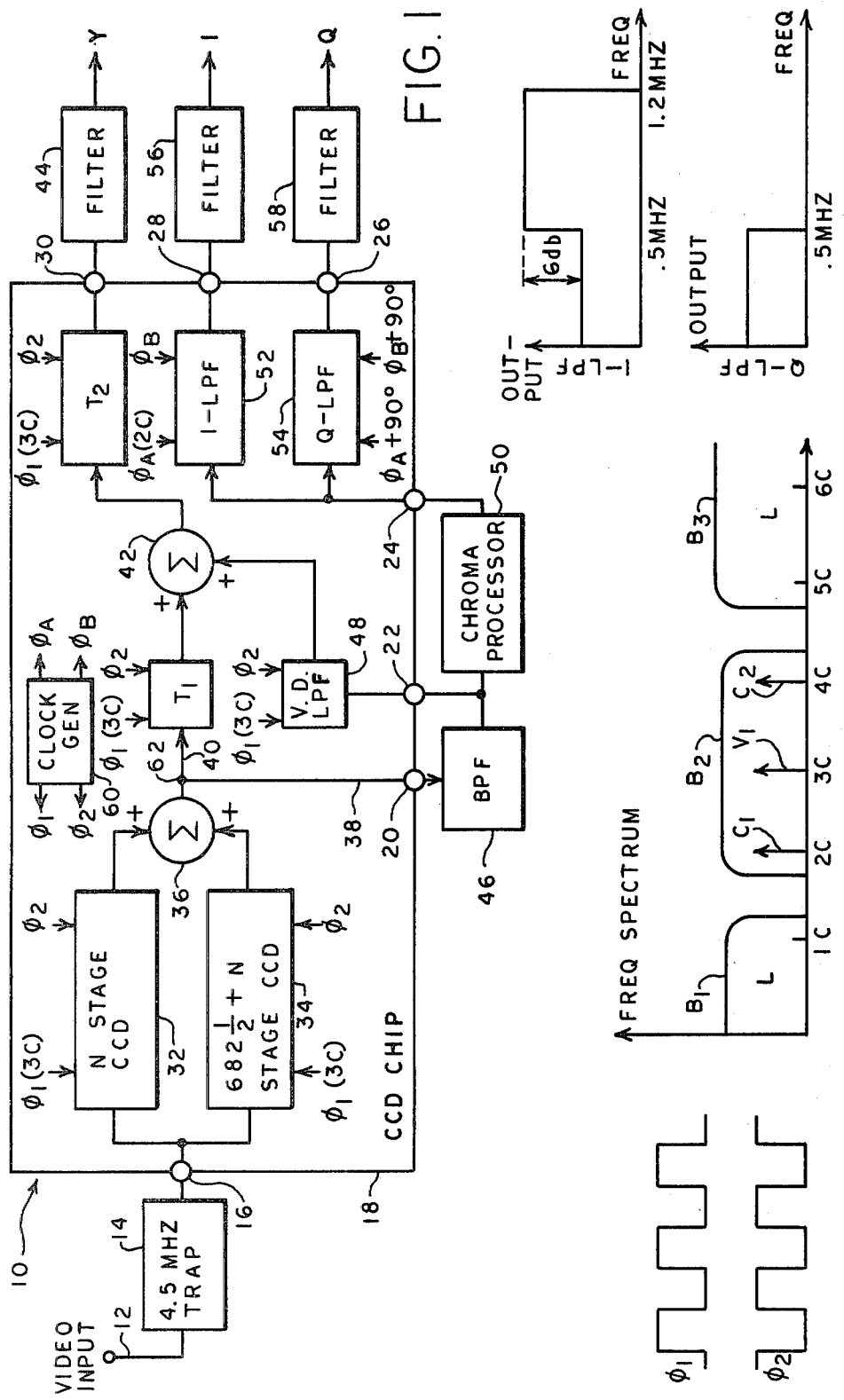

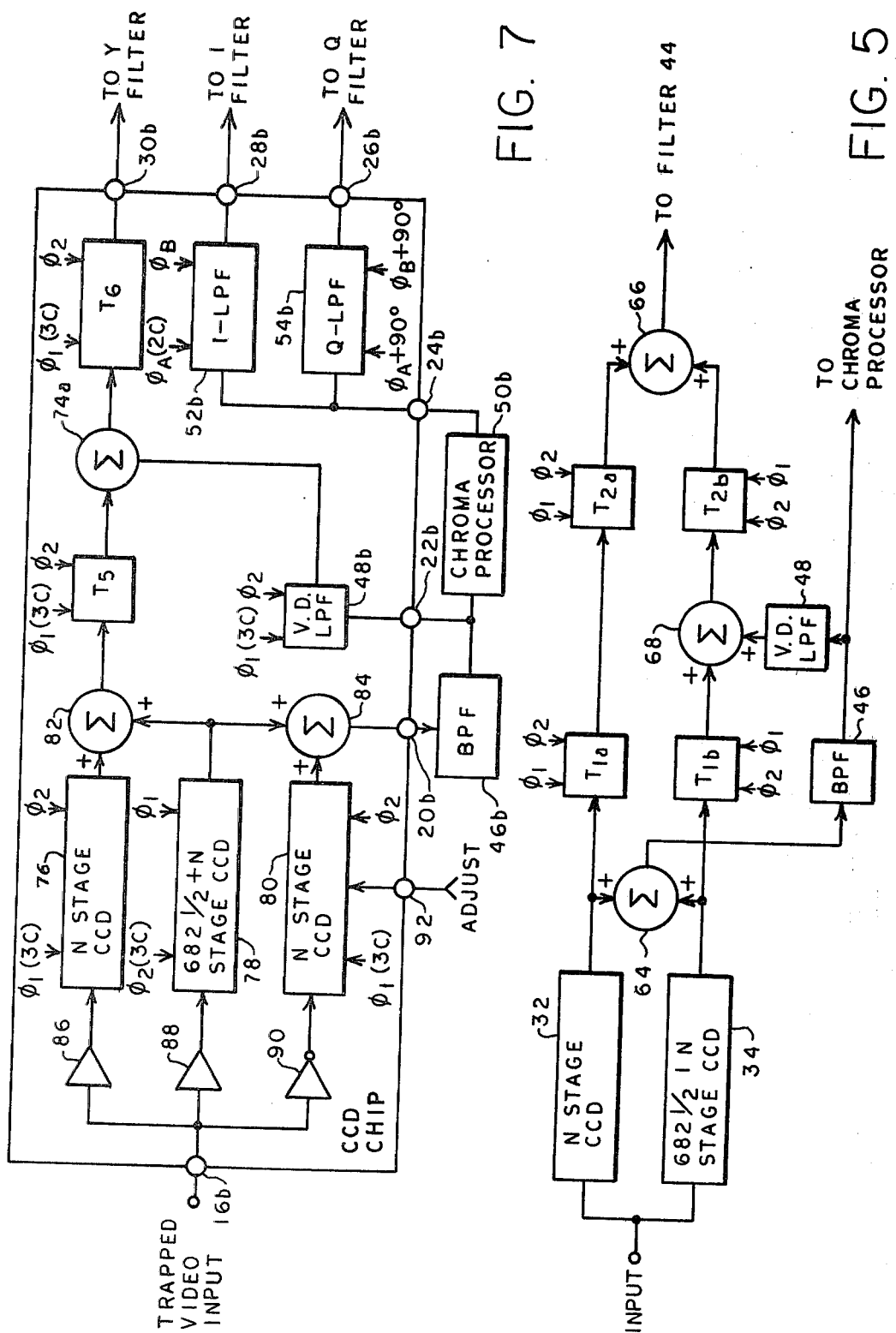

CCD COMB FILTER AND DEMODULATION SYSTEM

BACKGROUND OF THE INVENTION

The invention relates generally to improvements in television receivers. It is particularly directed to CCD (charge coupled device) comb filters for separating the luminance components from the color components of a television signal.

In NTSC type broadcast signals, luminance and color components are frequency-interleaved. At the receiver, those components are separated from each other and processed separately to develop a video image.

To effect the required separation between the luminance and color components, various well known types of filters may be employed. One such filter is known as a comb filter in which the combined video signal is processed along two parallel paths, one having an 1-H (one horizontal line interval) delay greater than the delay associated with the other path. The signals which are output from each path are combined so that color components are separated from luminance components. For good performance, the delay and gain associated with each path must be stable and accurate.

The delay paths for the comb filter are sometimes constructed of CCD devices, as described, for example, in U.S. Pat. No. 4,096,516. In the latter patent, three CCD delay devices are required to develop separated luminance and color signals. In addition, the video input to one of the delay devices must be inverted to obtain proper operation of the comb filter. The inclusion of the inverter makes it difficult to match the effective gain of all three delay paths, wherefore, gain adjustment is necessary. The need for such an adjustment is, of course, undesirable. Also, the need for three CCD delay devices renders the filter more complex than is desired.

In comb filtering systems of the type described above, it is customary to process the separated color signal to obtain relatively narrow band demodulated R-Y and B-Y color-difference signals. Although such narrow band signals are reasonably acceptable for use in developing a color image, it is understood in the television art that it is preferable to develop full bandwidth demodulated color signals, such as those commonly referred to as I and Q color signals. A system which employs fewer CCD delay devices to perform comb filtering, which eliminates the need for gain adjustment, and which provides wider band demodulated color signals would be particularly advantageous.

OBJECTS OF THE INVENTION

It is a general object of the invention to provide an improved CCD comb filtering system for use in separating the luminance components from the color components of a television signal.

It is a more specific object of the invention to provide a CCD comb filtering and demodulation system which provides a relatively wide band demodulated color signal.

It is another object of the invention to provide a CCD comb filtering system which is less complex than prior CCD filters and which requires no gain adjustment.

BRIEF DESCRIPTION OF THE FIGURES

The objects stated above and other objects of the invention are set forth with more particularity in the following detailed description and in the accompanying drawings, of which:

FIG. 1 illustrates an embodiment of a CCD comb filtering and demodulation system which embodies various aspects of the invention;

FIG. 2 shows a pair of clock waveforms used in the systems of FIGS. 1, 5, 6 and 7;

FIG. 3 depicts a frequency spectrum useful in explaining the operation of the system shown in FIG. 1;

FIG. 4 shows the general nature of the frequency responses associated with the I and Q filters of FIGS. 1, 6 and 7;

FIG. 5 illustrates an implementation of the more basic system shown in FIG. 1;

FIG. 7 shows yet another embodiment which employs the same demodulation system as those of FIGS. 1 and 6.

DESCRIPTION OF THE PREFERRED EMBODIMENT

Figure 6:
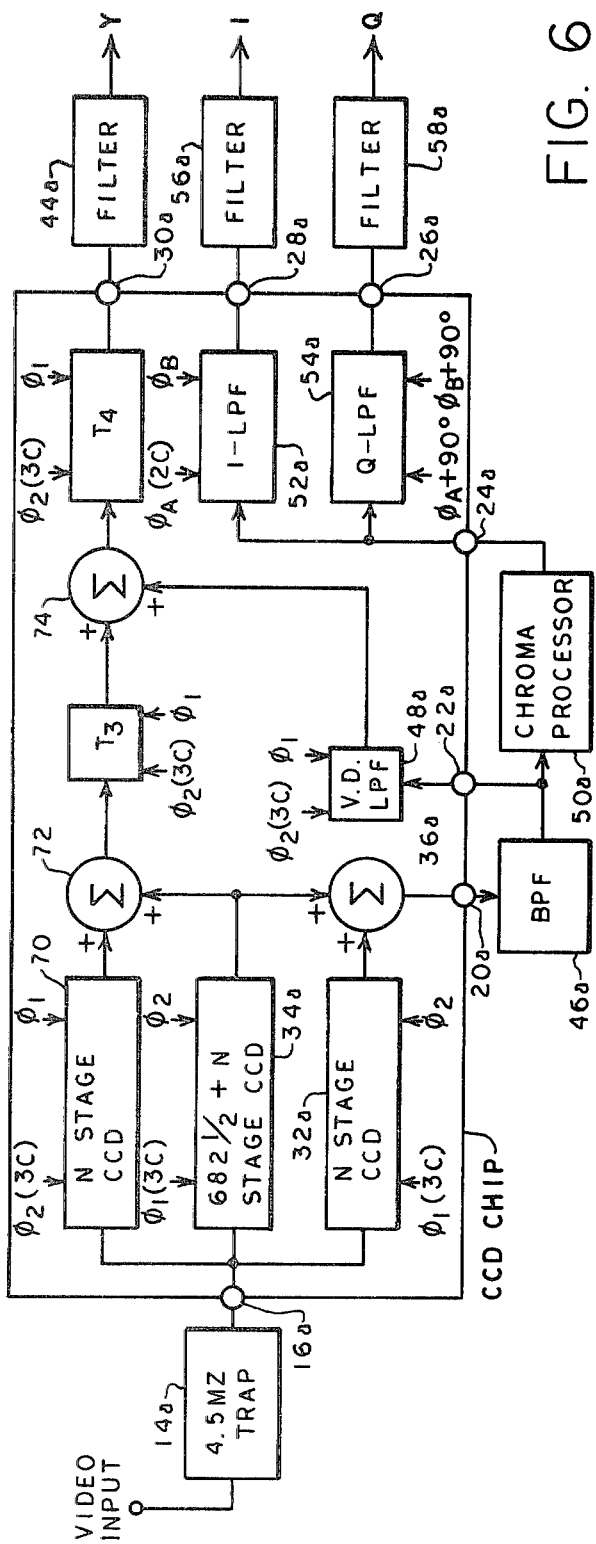
FIG. 6 shows an alternate comb filtering and color demodulation system.

Referring to FIG. 1, a comb filtering and color demodulation system 10 is shown which embodies various aspects of the invention. The input to the illustrated system is at a lead 12 where composite video, including luminance and color components, is received. Conventionally, the color information in the video signal is modulated on a subcarrier whose nominal frequency is approximately 3.58 megahertz, and the frequency of the luminance components extends from D.C. to about 4.2 megahertz. As is customary with NTSC-type broadcast signals, the luminance components of the composite video signal are frequency interleaved with the color components.

The video input signal is coupled to a 4.5 megahertz trap 14 for substantially eliminating the sound carrier associated with the video signal. The output of the trap 14 is coupled to an input pin 16 of a CCD chip 18. Additional input/output pins 20, 22, 24, 26, 28 and 30 are included for accessing the components which are included on the CCD chip.

To separate the luminance components from the color components of the signal at pin 16, the chip 18 includes a comb filter comprising an N stage CCD device 32, a 682½ plus N stage CCD device 34, and a summer 36. The output of the summer 36 is coupled to a color processing channel via a lead 38 for processing the color information associated with the video signal, and it is coupled to a luminance processing path via a lead 40 for processing the luminance components of the input signal. As shown, the luminance channel includes a first CCD delay device $T_1$ whose output is coupled to another CCD summer 42. The output of the latter device is coupled to the input of another CCD delay device $T_2$ whose output is coupled via the pin 30 to a reconstruction filter 44. The output of the filter 44 constitutes the Y or luminance signal from which all color components have been removed.

The color processing channel includes a bandpass filter 46 whose output is applied to a vertical detail low pass filter 48 and to the input of a chroma processor 50. The output of the processor 50 is coupled via the pin 24 to the inputs of an "I" low pass filter 52 and a "Q" low pass filter 54. The latter filters sample the output of the processor 50 so as to demodulate its color components.

The outputs of the filters 52 and 54 are applied to a pair of filters 56 and 58, from which full bandwith I and Q demodulated color signals may be obtained.

Referring more specifically to the CCD device 32, its input is coupled to the pin 16 for converting the signal voltage thereat to corresponding packets of charge for application to the summer 36. For this purpose, the device 32 includes N stages of delay, where N may be equal to 1, 5, 10 or any number of stages. The more stages which are included, the greater will be the delay provided by the device 32. However, the actual delay provided by the delay device 32 is not critical, as long as that delay is matched by a corresponding additional delay in the CCD device 34.

As shown, the device 32 may be a two phase type charge transfer device which receives a pair of clock signals identified as $\phi_1$ and $\phi_2$ from a conventional clock generator 60. The phases and the frequency of those clock signals are discussed below. Suffice it to say at this juncture that each of the CCD devices described herein receives two clock inputs, one such input being indicated to the left of the other clock input to indicate the convention wherein the CCD device samples its input on the leftmost appearing clock pulse. For example, the CCD device 32 is shown as having a clock input $\phi_1$ to the left of another clock input $\phi_2$. With the convention described above, the CCD stage 32 samples its input on the clock signal $\phi_1$.

The CCD device 34 is similar to the device 32 except that the former device includes a sufficient number of stages to delay its input signal from pin 16 by an interval equal to 1 H (one horizontal line interval) plus the delay associated with the CCD device 32. In this embodiment, the CCD device 34 preferably includes $682\frac{1}{2}$ stages plus the N stages associated with the device 32. Thus, if the device 32 includes two stages of delay, the device 34 will include $684\frac{1}{2}$ stages of delay. In this manner, the difference in delay between devices 32 and 34 is $682\frac{1}{2}$ stages. Because of the clock frequency selected, the $682\frac{1}{2}$ stages of delay constitute a 1 H difference in delay.

The clock signals $\phi_1$ and $\phi_2$ for the CCD stages 32 and 34 are shown in FIG. 2. Transition rates of the clock signals $\phi_1$ and $\phi_2$ may be adjusted for optimal CCD operation as is customary with CCD's. In this embodiment, the frequency of the clock signals $\phi_1$ and $\phi_2$ is selected to be equal to three times the nominal frequency of the color subcarrier, i.e., three times 3.58 megahertz. In addition, the clock signal $\phi_2$ is selected to be 180° out of phase with the clock signal $\phi_1$. In the figures herein, the color subcarrier frequency is indicated as 1C, clock signals having twice the nominal subcarrier frequency are indicated as 2C, and clock signals having a frequency of three times the nominal subcarrier frequency are indicated as 3C.

Referring again to FIG. 1, the CCD stages 32 and 34 are clocked at a 3C rate so as to sample their inputs on the clock signal $\phi_1$ and their delayed outputs are applied to the inputs of the summer 36.

Because of the frequency and phasing of the clock pulses $\phi_1$ and $\phi_2$, and because of the summing function effected by the summer 36, the signal output of the summer 36 (node 62) includes combed luminance components and combed color components which occupy different frequency bands. As shown in FIG. 3, the signal at node 62 includes luminance components L in a first, relatively low frequency band $B_1$ which extends from zero frequency to just beyond 1C. The color components C are included in a higher frequency band $B_2$ which extends from below 2C to just above 4C. In this latter band, the color components are centered about 3C, the lower sidebands thereof being below 3C and the upper sidebands thereof being above 3C. Another frequency band $B_3$ is shown which is centered around 6C and which contains only luminance components. Additional higher frequency bands (not shown) continue according to the pattern shown in FIG. 3.

Also shown in the band $B_2$ are components identified as $C_1$, $C_2$ and $V_1$. The component $C_1$ represents the color signal's color subcarrier which has been frequency-translated to 2C as a result of the sampling effected by the CCD devices 32 and 34. The component $C_2$ represents the color subcarrier in the upper sideband which has been translated to 4C. The component $V_1$ at 3C represents vertical detail components which, in the composite video input signal, are interleaved with low frequency luminance components. As described in detail hereinafter, the color processing channel eliminates, from the spectrum shown in FIG. 3, all components except the vertical detail components and desired color components in the band $B_2$, and inserts the vertical detail components into the luminance processing channel to provide a vertically peaked luminance signal. Once the vertical detail components have been inserted into the luminance channel, only color components are processed to provide demodulated color signals.

Referring again to FIG. 1, the signal at the node 62 is coupled via lead 38 to the bandpass filter 46. This filter may be constructed of conventional discrete components and may be selected to pass the entire frequency band $B_2$, to pass only the low sidebands occurring at 3C and below, or to pass only the upper sidebands occurring at 3C and above. Preferably, however, the filter 46 passes only the vertical detail and color components associated with the lower sideband in frequency band $B_2$.

The output of the filter 46 is coupled to the chroma processor 50 for effecting the customary functions of automatic color level control and the like with conventional analog circuitry. In the case where the bandpass filter 46 passes color components whose subcarrier is at 2C, the processor 50 is also adapted to operate at a frequency of 2C. If the color components output from the filter 46 include a subcarrier at another multiple of 1C (4C, for example), the processor 50 will operate at that multiple of the subcarrier frequency.

The output of the processor 50 is coupled to CCD chroma filters 52 and 54 which receive clock signals $\phi_A$ and $\phi_B$ whose frequency is selected to be equal to the subcarrier frequency passed by the bandpass filter 46. Thus, in the preferred case where the filter 46 outputs a color subcarrier at a frequency of 2C, the clock signals $\phi_A$ and $\phi_B$ also have a frequency of 2C. The latter clock signals may be developed by the generator 60 and are similar to the clock signals $\phi_1$ and $\phi_2$ as shown in FIG. 2, the signal $\phi_B$ being 180 degrees out of phase with the signal $\phi_A$.

The filters 52 and 54 are preferably input weighted transversal CCD filters. Because of the characteristics of such filters, they may and preferably are selected to have frequency responses selected to develop full bandwidth I and Q demodulated signals. For example, the I filter 52 and the Q filter 54 are preferably selected to have frequency responses of the general nature depicted in FIG. 4. As shown, the response for the I filter 52 is flat from D.C. to 0.5 megahertz and then increases its output by 6 db from 0.5 megahertz to about 1.2 megahertz. The response for the Q filter 54 is flat from dc to about 0.5 megahertz. In practice, the responses of the I and Q filters will deviate somewhat from the responses shown, but their passbands will be generally of the type shown. With such responses, the filters 52 and 54 output demodulated I and Q color signals which are of the maximum bandwidth obtainable in an NTSC type television receiver.

The outputs of the filters 52 and 54 may be coupled to so-called reconstruction filters 56 and 58 for removing the clock components contained in the filter outputs. Thus, where the filters 52 and 54 are clocked at a 2C rate, the reconstruction filters 56 and 58 are selected to eliminate the 2C clock components and to pass the demodulated I and Q color components. The latter components may then be amplified and processed in the usual manner to develop a color image.

As stated above, the output of the bandpass filter 46 includes vertical detail components at 3C. To vertically peak the luminance signal with these components, the output of the bandpass filter is coupled to the vertical detail filter 48. The latter filter is another CCD device which is clocked at 3C by the signals $\phi_1$ and $\phi_2$ in order to develop, at its output, vertical detail components at baseband and multiples of 3C.

In the case in which the bandpass filter is selected to pass all the components included in the band $B_2$ (FIG. 3), the vertical detail filter demodulates those components to baseband and operates as a low pass filter to pass the vertical detail components at baseband and at multiples of 3C. Typically, the low pass frequency response of the vertical detail filter 48 is selected to be 20 db down at about 2.5 megahertz and 30 db down at about 3 megahertz, with a 3 db point near 1 megahertz.

The output of the filter 48 is coupled to another summer 42 in the luminance channel to combine the vertical detail components with luminance components. The other input to the summer 42 is the signal at node 62 which is delayed by a CCD delay device $T_1$. The latter device is clocked by the signals $\phi_1$ and $\phi_2$ and provides a delay which compensates for the delay associated within the vertical detail filter 48 and the bandpass filter 46. Hence, the output of the summer 42 includes baseband luminance in the band $B_1$ (FIG. 3) which is vertically peaked. This output is coupled to another CCD delay device $T_2$ which is clocked by the signals $\phi_1$ and $\phi_2$ for delaying the peaked luminance signal for an interval sufficient to compensate for delays in the color channel introduced by the chroma processor, the I and Q filters, and differences between the delays of the reconstruction filters 44, 56 and 58. The output of the delay device $T_2$ may be coupled via pin 30 to a reconstruction filter 44 for removing 3C clock components from the luminance signal. The resultant luminance (Y) signal may then be processed in the usual manner to develop the television image.

Referring again to the node 62, it should be understood that the successive samples which are applied thereto by the summer 36 appear at an effective rate of 6C. Because of the half stage of delay in the device 34, its output samples (occurring at a 3C rate) are offset in time by one half a 3C clock period from the output samples developed by the device 32. Thus, when the signal samples from devices 32 and 34 are merged by the summer 36, the output at node 62 essentially includes two groups of 3C samples, one group of which is interleaved with the other group as opposed to being time coincident with it. Consequently, the signals at node 62 essentially occur at a 6C rate with the frequency spectrum shown in FIG. 3. Because of the frequency separation between the luminance and color signals, the color channel readily separates luminance components from color components. In the luminance channel, the two groups of 3C signals may be processed independently of each other as shown in FIG. 5, to which reference is now made.

In this embodiment, the outputs of CCD devices 32 and 34 are again combined in a summer 64, as was done in the embodiment of FIG. 1. Hence, the spectrum associated with the signal output of the summer 64 is as shown in FIG. 3. That signal output is coupled to the bandpass filter 46 and to the other elements in the color channel for processing the color components in the manner shown in FIG. 1.

In the luminance channel, the output of the CCD device 32 constitutes a first group of signals occurring at a 3C rate. That group of signals is input to a CCD delay device $T_{1a}$ which is clocked by the signals $\phi_1$ and $\phi_2$. Its delayed output is coupled to another CCD delay device $T_{2a}$ which is also clocked by the signals $\phi_1$ and $\phi_2$. The delayed output of the latter device is coupled to one input of a summer 66.

The output of the CCD device 34, another group of signals occurring at a 3C rate, is coupled to a CCD delay device $T_{1b}$ which is clocked by the signals $\phi_2$ and $\phi_1$. The delayed output of the latter device is coupled to one input of another summer 68, the other input to which is the vertical detail components output by the vertical detail filter 48. Thus, vertical detail components which are time coincident with the group of signals output from the delay device $T_{1b}$ are combined with the latter signals in the summer 68. The combined output of the summer 68 is input to a CCD delay device $T_{2b}$ which is clocked by $\phi_2$ and $\phi_1$, and its delayed output is coupled to the other input of the summer 66. The summer 66 combines the vertically peaked luminance components from the delay device $T_{2b}$ with the luminance components output by the delay device $T_{2a}$ to provide a composite luminance output which may be applied to the reconstruction filter 44 (FIG. 1).

In practice, the delay devices $T_{1a}$ and $T_{1b}$ may each introduce the same amount of delay as the delay device $T_1$ (FIG. 1). Likewise, delay devices $T_{2a}$ and $T_{2b}$ may each introduce the same amount of delay as the delay device $T_2$. All these delay devices may be constructed of CCD devices of the type described in U.S. Pat. No. 4,096,516. The CCD devices 32 and 34 and the CCD summer 42 (FIG. 1) and 68 (FIG. 5) may also be of the type described in the latter patent. The CCD summers 36 (FIG. 1), 64 (FIG. 5) may be of the type having multiplexed inputs for alternately receiving the signal output from CCD devices 32 and 34, and a common output. The CCD summer 66 may be similar to the summer 36. The vertical detail filter 48 and the I and Q filters 52 and 54 may be designed as described in the book entitled "Digital Signal Processing" (1972), published by the IEEE press.

Among the advantages of the comb filter and demodulation system described above is the fact that comb filtering is effected by using but a two path comb filter, one path which includes the CCD device 32 and another path which includes the CCD device 34. In addition, neither path requires signal inversion at its input or any gain adjustment. Further, all summing devices, delay devices, and the vertical detail filter may be CCD devices which are included on a single CCD chip.

The demodulation scheme described above, operating as it preferably does at a 2C rate, provides baseband color components which are sufficiently separated in frequency from undesired components so that sharp cut-off reconstruction filters are not necessary. In addition, the use of CCD filters for color demodulation makes full bandwidth color demodulation more feasible.

Another embodiment of the comb filtering and demodulation system is shown in FIG. 6 in which elements which correspond to elements of FIG. 1 have the same reference numeral followed by the alpha character "a". This alternate embodiment performs the same functions as the embodiment of FIG. 1 but eliminates the need for separately processing two groups of components sampled at a 3C rate in the manner shown in FIG. 5.

The composite video input is again coupled through a 4.5 megahertz sound trap 14a and is applied to the CCD chip at input pin 16a. Receiving the input video signal is a comb filter comprising CCD devices 32a, 34a, and 70, and summers 36a, and 72. The CCD devices 32a and 34a operate in conjunction with the summer 36a to provide, at pin 20a, a combed signal whose frequency spectrum is the same as that shown in FIG. 3. As with the embodiment of FIG. 1, CCD devices 32a and 34a sample their inputs on the clock signal $\phi_1$.

The frequency-separated luminance and color components at pin 20a are applied to a bandpass filter 46a which removes baseband luminance components and undesired high frequency components. The output of the filter 46a is applied to a chroma processor 50a, then to I and Q filters 52a and 54a. Thus, demodulated color signals are developed at output pins 26a and 28a and their clock components may be eliminated by reconstruction filters 56a and 58a.

To develop a combed luminance signal, another N stage CCD device 70 receives the video input from pin 16a and samples it on the clock signal $\phi_2$ at a 3C rate. Thus, the CCD device 70 samples its input out of phase with the sampling which is effected by devices 32a and 34a. The output of the device 70 is input to a summer 72 which also receives the output of the device 34a. Consequently, the output of the summer 72 includes only luminance components at baseband and at multiples of 3C. No color components are present in the output of the summer 72, nor are any components present which have a 6C sampling rate.

The output of the summer 72 is applied to a luminance channel which includes a CCD delay device $T_3$, a CCD summer 74, and other CCD delay device $T_4$. The delay device $T_3$ delays its input signal for an interval which corresponds to the delay introduced by the bandpass filter 46a and a vertical detail filter 48a. The latter device receives the output of the bandpass filter 46a and develops vertical detail components at baseband and at multiples of 3C as previously described. Those vertical detail components are combined in the summer 74 with luminance components to provide a vertically peaked luminance signal at the output of the summer 74. That peaked luminance signal is delayed again by the delay device $T_4$ to compensate for delays introduced by the chroma processor 50a, the filters 52a, 54a, and the differences in delay of the reconstruction filters 44a, 56a and 58a. The 3C rate components output by the delay device $T_4$ may be removed by the reconstruction filter 44a to provide a baseband luminance signal (Y) at the output of the fliter 44a.

The advantages of the system shown in FIG. 6 include the ability to develop wider band I and Q color signals, the use of reconstruction filters 56a and 58a which do not require sharp cut-off frequency responses, the elimination of any inverter at the input to the comb filter, and the absence of any gain adjustment.

Referring now to FIG. 7, another embodiment is shown of a comb filtering and demodulation system for developing, on the CCD chip, wide band demodulated color signals and vertically peaked luminance signals. In this embodiment, the comb filter itself is conventional, and includes an N stage CCD device 76, a 682½ plus N stage CCD device 78, another N stage CCD device 80, and summers 82 and 84. The video inputs to devices 76, 78 and 80 are coupled through amplifiers 86 and 88 and an inverting amplifier 90 (the amplifiers 86–90 may be attenuators instead of amplifiers). For proper operation, the amplifier 86 and the CCD device 76 should have a combined gain equal to the combined gain of the amplifier 88 and the CCD device 78. The magnitude of those gains should be equal to the magnitude of the combined gain of the amplifier 90 and the CCD device 80.

The outputs of the amplifiers 86 and 88 are coupled to the respective inputs of CCD devices 76 and 78, and the sampled outputs of the latter devices are combined in the summer 82. With this arrangement, the output of the summer 82 comprises combed luminance components at baseband and at multiples of 3C. The combed luminance components developed by the summer 82 are coupled by a CCD delay device $T_5$ which is clocked at a 3C rate for delaying the luminance signals for an interval corresponding to the delay introduced by the bandpass filter 46b and the vertical detail filter 48b. The output of the device $T_5$ is coupled via a summer 74a and another clocked CCD delay device $T_6$ to the output pin 30b. The signal at pin 30b may be input to a luminance reconstruction filter as shown in FIG. 6.

Figure 8:
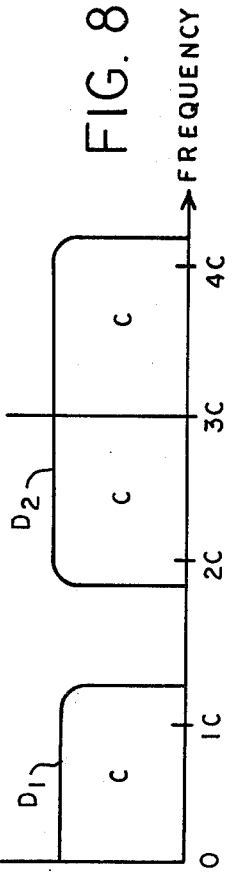
FIG. 8 depicts a frequency spectrum useful in describing the operation of the structure shown in FIG. 7.

The output of inverting amplifier 90 is coupled to the CCD device 80, and the output of the latter device is combined with the output of the device 78 in the summer 84. The output of the summer 84 at pin 20b is as shown in FIG. 8 wherein the color components (c) occupy a lower frequency band $D_1$ and a higher frequency band $D_2$. The band $D_2$ includes color components in a lower sideband below 3C, upper sideband components above 3C, and vertical detail components at 3C. The bandpass filter 46b may filter out all but the lower sideband color components and vertical detail components in the band $D_2$.

The filtered color components whose subcarrier is translated in frequency to 2C are processed by the chroma processor 50b and demodulated by the I and Q filters 52b and 54b. Once again, the filter 52b is clocked at 2C by signals $\phi A$ and $\phi B$ and the filter 54b is clocked by signals which are offset by 90 degrees from $\phi A$ and $\phi B$. The outputs of both filters may be applied to I and Q reconstruction filters for removal of clock components and undesired high frequency components.

The output of the bandpass filter 46b is also coupled to a vertical detail filter 48b for sampling the vertical detail components at 3C and for coupling such components, at baseband and at multiples of 3C, to the summer 74a for developing a vertically peaked luminance signal.

The output of the summer 74a is coupled to another CCD delay device $T_6$ to compensate for delays associated with the chroma processor 50b, the filters 52b and 54b, and the reconstruction filters coupled to pins 26b, 28b and 30b. The delayed output at pin 30b may be coupled to a Y reconstruction filter as described above.

Referring again to the CCD device 80, it may be provided with a gain adjustment applied thereto via an input pin 92. The purpose of the gain adjustment is to compensate for any mismatch between the gain of the inverting amplifier 90, on the one hand, and the gain of the non-inverting amplifiers 86 and 88, on the other hand. The gains of the latter two amplifiers are considered to be matched to each other. The gain adjustment which is required for the CCD device 80 may be effected as described in U.S. Pat. No. 4,158,209.

Although the embodiment of FIG. 7 requires the above-mentioned gain adjustment, it retains the advantages of the other embodiments, i.e., on-chip summing, delay and vertical peaking, in addition to providing wideband, on-chip color demodulation.

Although the invention has been described in terms of preferred structure, it will be obvious to those skilled in the art that many alterations and modifications thereto may be made without departing from the invention. Accordingly, all such modifications and alterations are deemed to be within the spirit and scope of the invention as defined by the appended claims.

What is claimed is:

1. In a television receiver which develops a video signal having luminance components interleaved with color components modulated on a color subcarrier having a nominal frequency, a comb filtering and color demodulation system, comprising:

filter means including a comb filter adapted to receive the video signal for developing a comb-filtered output signal which includes color components whose subcarrier and its sidebands are translated in frequency above the nominal subcarrier frequency by a given multiple of the latter frequency; and first and second CCD output filters receiving said output signal and receiving clock signals whose frequency is selected to be equal to said given multiple of the nominal subcarrier frequency so as to develop baseband demodulated color signals.

2. A system as set forth in claim 1 wherein said comb filter is adapted to be clocked so as to provide an output signal whose color subcarrier is translated upward in frequency by twice the nominal subcarrier frequency, and wherein said first and second CCD filters receive clock signals whose frequency is twice the nominal subcarrier frequency.

3. A system as set forth in claim 1 wherein said first and second CCD filters have frequency responses selected to develop wideband I and Q demodulated color signals.

4. A system as set forth in claim 1 wherein said comb filter includes:

a first CCD device receiving the video signal, having N stages of delay, and being clocked at a frequency of three times the nominal color subcarrier frequency;

a second CCD device receiving the video signal, having 682½ plus N stages of delay, and being clocked at a frequency of three times the nominal color subcarrier frequency; and a summer for combining the delayed outputs of said first and second CCD devices so as to develop a signal output having combed luminance components and combed color components which occupy different frequency bands.

5. A system as set forth in claim 4 wherein the frequency band which includes the color components output from said summer also includes vertical detail components, and further including:

a bandpass filter coupled to the output of said summer for developing a signal output which includes color components and vertical detail components and from which luminance color components are substantially eliminated;

means for coupling the output of said bandpass filter to said first and second CCD output filters for demodulation of the color components;

a vertical detail filter coupled to the output of said bandpass filter for developing an output which includes substantially only the vertical detail components; and means for combining the output of said vertical detail filter with luminance components output from the comb filter.

6. A system as set forth in claim 1 wherein said comb filter includes:

a first CCD device receiving the video signal, having N stages of delay, and being clocked at a frequency of three times the nominal color subcarrier frequency;

a second CCD device receiving the video signal, having 682½ plus N stages of delay, and being clocked at a frequency of three times the nominal color subcarrier frequency;

a third CCD device receiving the video signal, having N stages of delay, and being clocked at a frequency of three times the nominal color subcarrier frequency;

means for combining the outputs of the first and second CCD devices to provide a luminance channel output;

means for combining the outputs of the second and third CCD devices to provide a color channel output;

all said CCD devices being clocked such that the luminance channel output includes substantially only luminance components at baseband and at multiples of three times the nominal color subcarrier frequency and such that the color channel includes luminance components and color components which occupy different frequency bands; and means receiving the color channel output for removing the luminance components therefrom and for coupling the color components to said output filters for demodulation of the color components.

7. A system as set forth in claim 6 wherein the color channel output includes vertical detail components in the frequency band occupied by the color components, wherein said means for removing the luminance components from the color channel includes a bandpass filter for developing a signal output which includes color components and vertical detail components, and further including:

a vertical detail filter coupled to the output of said bandpass filter for developing an output which includes substantially only the vertical detail components; and means for combining the luminance components in the luminance channel output with the vertical detail components from said vertical detail filter to provide a vertically peaked luminance output signal.

8. In a television receiver which develops a video signal having luminance components interleaved with color components modulated on a color subcarrier having a nominal frequency, a comb filtering and color demodulation system, comprising:
- a first CCD device receiving the video signal, having N stages of delay, and being clocked at a frequency of three times the nominal color subcarrier frequency;
- a second CCD device receiving the video signal, having $682\frac{1}{2}$ plus N stages of delay, and being clocked at a frequency of three times the nominal color subcarrier frequency;
- a summer combining the delayed outputs of said first and second CCD devices for developing a signal output having combed luminance components and combed color components which occupy different frequency bands;
- a color processing channel including a bandpass filter receiving the output of said summer for developing an output signal which is substantially free of luminance components;
- a pair of demodulators;
- means for coupling the output of the bandpass filter to said demodulators for demodulating the color components; and
- a luminance processing channel including means coupled to said first and second CCD devices for summing their outputs so as to provide a luminance output containing baseband luminance components.

9. A system as set forth in claim 8 wherein the frequency band which includes the color components output from said summer also includes vertical detail components, wherein the output of said bandpass filter includes vertical detail components, and further including means receiving the output of said bandpass filter for combining the vertical detail components with the luminance components in the luminance processing channel.

10. In a television receiver which develops a video signal having luminance components interleaved with color components modulated on a color subcarrier having a nominal frequency, a comb filtering and color demodulation system, comprising:
- a first CCD device receiving the video signal, having N stages of delay, and being clocked at a frequency of three times the nominal color subcarrier frequency;
- a second CCD device receiving the video signal, having $682\frac{1}{2}$ plus N stages of delay, and being clocked at a frequency of three times the nominal color subcarrier frequency;
- a third CCD device receiving the video signal, having N stages of delay, and being clocked at a frequency of three times the nominal color subcarrier frequency;
- means for combining the outputs of the second and third CCD devices to provide a color channel output;
- all said CCD devices being clocked such that the luminance channel output includes substantially only luminance components at baseband and at multiples of three times the nominal color subcarrier frequency and such that the color channel includes luminance components and color components which occupy different frequency bands;
- a bandpass filter receiving the color channel output for removing the luminance components therefrom; and
- a pair of demodulators receiving the output of said bandpass filter for demodulating the color components.

11. A system as set forth in claim 10 wherein the color channel output includes vertical detail components, wherein the output of said bandpass filter includes vertical detail components, and further including means receiving the output of said bandpass filter for combining the vertical detail components with the luminance components in the luminance channel output.

12. In a television receiver which develops a video signal having luminance components interleaved with color components modulated on a color subcarrier having a nominal frequency, a comb filtering and color demodulation system, comprising:
- a first CCD device receiving the video signal, having N stages of delay, and being clocked at a frequency of three times the nominal color subcarrier frequency;
- a second CCD device receiving the video signal, having $682\frac{1}{2}$ plus N stages of delay, and being clocked at a frequency of three times the nominal color subcarrier frequency;
- a first summer combining the delayed outputs of said first and second CCD devices for developing a signal output which includes luminance components in a first, relatively low frequency band, and color and vertical detail components in a second higher frequency band centered around a frequency of three times the nominal color subcarrier frequency;
- a color processing channel including a bandpass filter receiving the output of said summer for developing an output signal which is substantially free of luminance components;
- a pair of demodulators;
- means for coupling the output of the bandpass filter to said demodulators for demodulating the color components;
- first delay means receiving the output of one of said first and second CCD devices and clocked at a frequency of three times the nominal color subcarrier frequency for developing a first delayed output;
- second delay means receiving the first delayed output and clocked at a frequency of three times the nominal color subcarrier frequency for developing a second delayed output;
- third delay means receiving the output of the other of said first and second CCD devices and being clocked at three times the nominal color subcarrier frequency for developing a third delayed output;
- a vertical detail filter receiving the output of said bandpass filter for developing an output comprising vertical detail components at a frequency of three times the nominal color subcarrier frequency;
- a second summer for combining the vertical detail components from said vertical detail filter with the output from said third delay means;
- a fourth delay means receiving the combined output from said second summer and being clocked at a frequency of three times the nominal color subcarrier frequency for developing a fourth delayed output; and a third summer for combining the outputs of said second and fourth delay means so as to develop a luminance output signal which is vertically peaked.

13. In a television receiver which develops a video signal having luminance components interleaved with color components demodulated on a color subcarrier having a nominal frequency, a comb filtering and color demodulation system, comprising:

a first CCD device receiving the video signal and having N stages of delay for sampling the video signal on a clock pulse $\phi_2$ whose frequency is equal to three times the nominal frequency of the color subcarrier;

a second CCD device receiving the video signal and having $682\frac{1}{2}$ plus N stages of delay for sampling the video signal on a clock pulse $\phi_1$ whose frequency is equal to three times the nominal frequency of the color subcarrier and whose phase is offset by 180 degrees from the clock pulse $\phi_2$;

a third CCD device receiving the video signal and having N stages of delay for sampling the video signal on the clock pulse $\phi_1$;

a first summer for combining the outputs of the first and second CCD devices to provide a luminance channel output which includes substantially only luminance components at baseband and at multiples of three times the nominal color subcarrier frequency;

a second summer for combining the outputs of said second and third CCD devices to provide a color channel output which includes luminance components in a first, relatively low frequency band, the color and vertical detail components in a second, higher frequency band centered around a frequency of three times the nominal color subcarrier frequency;

a bandpass filter receiving the color channel output for removing the luminance components therefrom;

a pair of demodulators;

means for coupling the output of the bandpass filter to said demodulators for demodulating the color components;

a vertical detail filter receiving the output of the bandpass filter for developing an output comprising vertical detail components at a frequency of three times the nominal color subcarrier frequency;

first delay means receiving the luminance channel output from the first summer for developing a delayed luminance output; and a third summer for combining the delayed luminance output with vertical detail components from the vertical detail filter to provide a vertically peaked luminance signal.

* * * * *